June 14, 1960  A. E. ENGELHARDT  2,940,783
SHAFT CLAMPING DEVICES
Filed Feb. 4, 1958
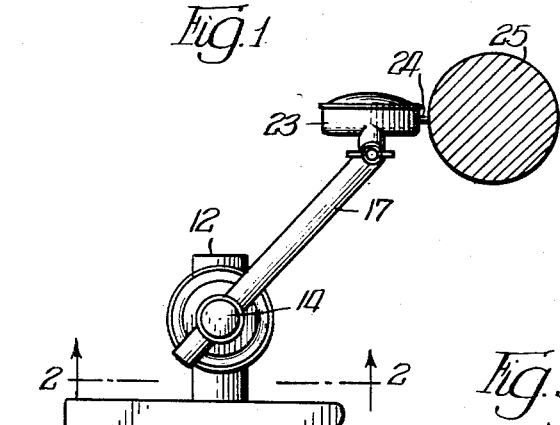
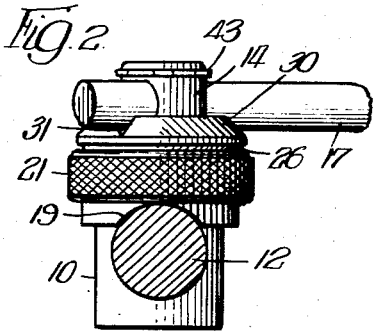
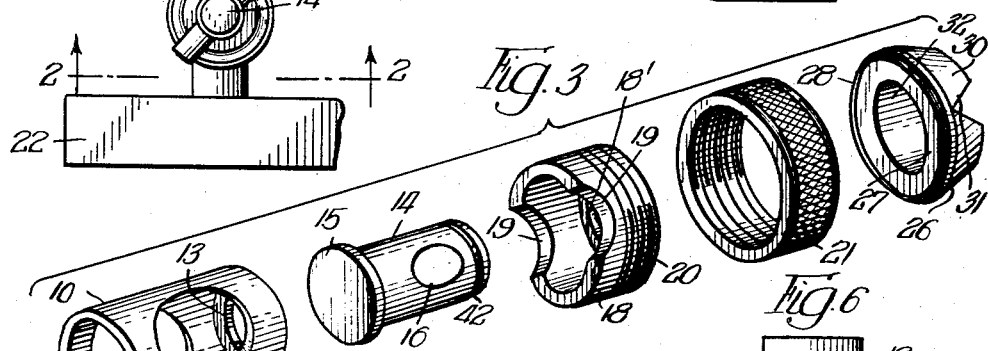
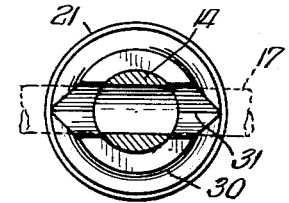
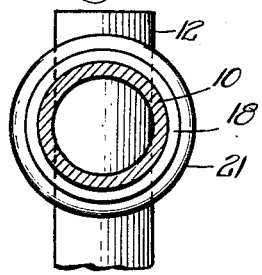
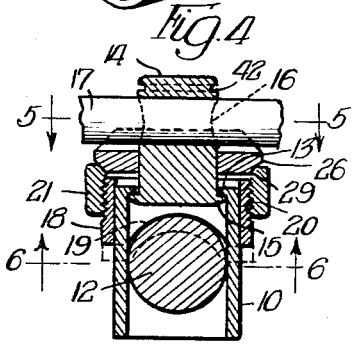
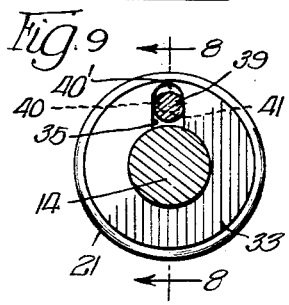
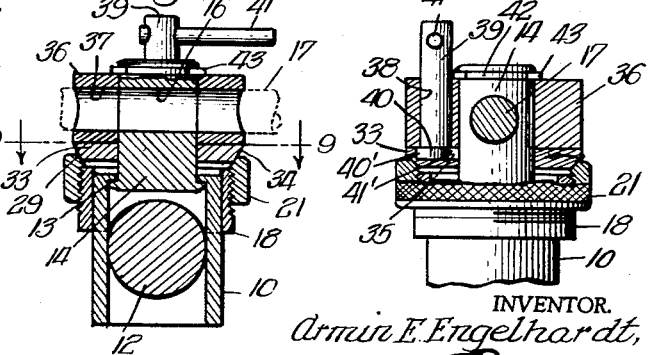
INVENTOR.
Armin E. Engelhardt,
BY
ATTY

United States Patent Office 2,940,783
Patented June 14, 1960

2,940,783

SHAFT CLAMPING DEVICES

Armin E. Engelhardt, 610 McLean St., Bensenville, Ill.

Filed Feb. 4, 1958, Ser. No. 713,193

11 Claims. (Cl. 287—56)

The present invention relates to clamping devices, and has for its main object the provision of a clamping unit for clamping a pair of shafts or rods for maintaining them in a rigid mutual angular relation.

Another object of the present invention is the provision of a clamping device embodying a shaft retaining or supporting member, through which a pair of shafts may be extended in an angular mutual relation, with an extensible member mounted upon said shaft retaining member, and interposed between a pair of shafts for bearing thereagainst for maintaining the shafts in a rigid relation with said shaft retaining member.

Another object of the present invention is the provision of a clamping device of the type indicated, wherein said extensible member may be made of a pair of telescopically arranged annular elements threadedly interconnected, whereby said elements may be capable of extension, that is capable of being lengthened, when a rotary shifting movement is imparted to one of said elements, for the purpose of exerting pressure upon the two shafts for maintaining the latter in a rigid clamped relation with the shaft retaining member, and whereby said elements may be capable of contraction, that is capable of being shortened, when a rotary shifting movement is imparted to one of said elements in the opposite direction, for releasing the pressure upon the two shafts preparatory to removing the shafts from the shaft retaining member or longitudinally adjusting the same with relation to said member.

A further object of the present invention is the provision in a clamping device of the type indicated of a shaft retaining member including a pair of telescopically arranged elements interconnected in a longitudinal direction but which may be capable of a relative rotary movement, whereby a pair of shafts may be angularly adjusted with respect to each other.

A still further object of the present invention is the provision in a clamping device of the type indicated of means whereby shafts of various diameters may be received and supported by the said shaft retaining member.

Another object of the present invention is the provision of a suitable mechanism whereby a finer mutual angular adjustment of a pair of shafts may be effected after the shafts have been angularly adjusted by rotary adjustment by mutual rotation of the pair of said telescopically arranged elements in said shaft retaining member, and after the said extensible member has been caused to bear pressure against the shafts.

Another object of the present invention is to improve and simplify the construction of a clamping device disclosed in my Patent 2,696,996, dated December 14, 1954.

With the above general objects in view and others that will appear as the invention is better understood, the same consists in the novel construction, combination and arrangement of parts hereinafter more fully described, illustrated in the accompanying drawing and pointed out in the appended claims.

In the drawing forming a part of this application and in which like designating characters refer to corresponding parts throughout the several views:

Fig. 1 shows an end elevational view of the present device, illustrating one of the many possible uses thereof, namely, when the same supports a dial indicator for measuring the surface of a cylinder fashioned by a lathe or like machine, the view illustrating a stationary, vertically supported shaft upon which the present clamping device may be adjusted in a vertical direction, and also another shaft angularly adjusted with relation to said vertical shaft, for supporting a dial indicator;

Fig. 2 is a side elevational view of the present clamping device, the view having been taken along the plane indicated by lines 2—2 of Fig. 1;

Fig. 3 is an exploded view of the several parts, which, when properly arranged make up the present clamping device;

Fig. 4 is a longitudinal cross sectional view through the clamping device;

Fig. 5 is an end elevational view of the clamping device, partly in section, taken along line 5—5 of Fig. 4;

Fig. 6 is a transverse cross sectional view on line 6—6 of Fig. 4;

Fig. 7 is a longitudinal cross sectional view through the clamping device, illustrating the application of the mechanism whereby finer angular adjustment of a pair of shafts may be effected;

Fig. 8 is a similar view, substantially taken at a 90 degree angle from the view shown in Fig. 7, the view having been taken substantially on line 8—8 of Fig. 9; and Fig. 9 is a transverse cross sectional view, partly in elevation, taken along line 9—9 of Fig. 7.

Referring to the present drawing, particularly to the showing of the clamping device in Figs. 2 to 6, inclusive, the clamping device includes sleeve 10, which is provided with a pair of diametrically opposed openings 11, for receiving therewithin shaft 12 in a transverse relation with said sleeve 10.

The inner end of said sleeve 10 is provided with an inwardly directed flange 13. Extending through the opening defined by said flange 13 is cylinder 14, the inner end of which is provided with an outwardly extending flange 15. Said flange 15 substantially corresponds in its diameter to the inner diameter of said sleeve 10, as is seen in Fig. 4.

Said cylinder 14 is extended by its free outer end through the outer free end of said sleeve 10, and is passed through the opening defined by said flange 13. The two flanges 13 and 15 coming in contact, as seen in Fig. 4, prevent the disengagement of said sleeve 10 from said cylinder 14 in a longitudinal direction. However, said flanges 13 and 15 permit a mutual rotary movement of said sleeve 10 and cylinder 14. By virtue of the mutual arrangements of said sleeve 10 and cylinder 14, the two remain in a mutually telescopic relation.

Adjacent its outer free end said cylinder 14 is provided with a diametrical opening 16, for receiving therewithin shaft 17 wherein said shaft is capable of longitudinal shifting movement, until shafts 12 and 17 are made rigid with the shaft retaining member, which includes said sleeve 10 and said cylinder 14, by virtue of the operation of an extensible member, presently described.

The said extensible member includes sleeve 18, the outer end of which is provided with a pair of diametrically opposed arcuate recesses 19. Receivable within said recesses 19 is portion of the periphery of shaft 12, whereby the body portions of said sleeve 18 adjacent said recesses 19 are capable of contacting with and bearing against the periphery of shaft 12 when the several parts of the clamping device remain in an operative position.

The opposite end of said sleeve 18 is externally threaded as at 20. Coacting with said sleeve 18 is ring 21, which on its inner periphery is provided with threads which engage threads 20 in said sleeve 18. Outwardly said ring is knurled to facilitate manual rotation thereof. Preferably threads 20 upon said sleeve 18, and the inner threads of said ring 21 are left hand threads so that when said ring 21 is rotated to the clockwise direction said ring 21 shifts upon sleeve 18 away from said recesses 19, so that a mutual extension of said sleeve 18 and ring 21 takes place.

The above description has described the essential parts that go into the making of a sufficiently operative clamping device. When the extensible member, including sleeve 18 and ring 21, is interposed between shafts 12 and 17, in an encompassing relation with the shaft retaining member, including said sleeve 10 and said cylinder 14, and when said ring 21 is rotated to a proper direction, sleeve 18 will be caused to exert a strong frictional contact with shaft 12, while the outer end rim of ring 21 will be caused to bear against shaft 17. By virtue of the action of said extensible member upon said shafts 12 and 17, both of said shafts will become interlocked with the shaft retaining member, including said sleeve 10 and cylinder 14, for the purpose of maintaining the two shafts in their angularly adjusted relation, as best seen in Fig. 1.

Referring now more particularly to Fig. 1 there is shown one exemplification of the practical adaptation of the present device to use. Shaft 12, which in this instance is stationary, is rigidly supported upon base 22. Said shaft 12 is of course passed through sleeve 10, and positioned within openings 11 thereof. Moving the clamping device to or away from base 22 will bring the device to the required proper adjustment with relation to said shaft 12.

The upper end of shaft 17 in Fig. 1 is made to support casing 23 containing a dial indicator actuable by contact pin 24 extending from casing 23 and made to contact with the cylindrical work 25 which is being fashioned by a lathe or a similar machine. When said shafts 12 and 17 have been brought to a proper required angular adjustment rotary movement to ring 21 is applied in order to extend the extensible member to cause the same to bear against shafts 12 and 17, as was already described, for the purpose of interlocking said shafts 12 and 17 with said shaft retaining member, including sleeve 10 and cylinder 14. The angular mutual adjustment of shafts 12 and 17 is possible due to the fact that cylinder 14 and sleeve 10 are capable of mutual rotary adjustment.

If desired, said shaft retaining member may be made solid, that is in the form of one shaft, provided therein with a bore to correspond to the openings 11, and with another bore in an angular relation with the first bore, to correspond to the opening 16. In such a homogeneous shaft retaining member the bores or openings for reception of shafts 12 and 17 would be fixed insofar as their mutual angularity is concerned. In such a homogeneous shaft retaining member the mutual angularity of shafts 12 and 17 would be predetermined. A clamp wherein the shaft retaining member is made of one piece, although incapable of angularly adjusting the two shafts, could be used with great many objects or devices, because in connection with such a modified clamping device, the two shafts would nevertheless be capable of longitudinal adjustments. Therefore, from a broader aspect of the invention the shaft retaining member, including said sleeve 10 and cylinder 14, may be deemed as made in one piece in the shape of a cylinder. Such a modified clamp would still require the extensible member, including sleeve 18 and ring 21 to bear against the two shafts and maintain them in their longitudinally adjusted relation.

Opening 16 is capable of receiving a shaft, such as shaft 17, of a diameter smaller than the diameter of said opening 16. Such shaft would have a tendency of wobbling in a lateral direction from the longitudinal axis of the shaft, were the shaft to be engaged solely by the outer end rim of ring 21 to maintain it in a clamped relation with cylinder 14. To obviate that objection additional part is provided for the clamping device, which consists of an annular clamping member 26 which has straight face 27 at its rear end, and a bevelled rim 28 adjacent said face 27. Ring 21 is provided with a bevelled mouth 29 which forms a seat for said bevelled rim 28. The front end of said annular clamping member 26 is of a substantially frusto-conical formation, as at 30, and is provided with a diametrical V-shaped slot 31, within which shaft 17 is receivable and is therewithin seated for the purpose of preventing any lateral wobbling of the shaft if the shaft is of a diameter smaller than the diameter of said opening 16. By virtue of this construction the body portions of the front end 30 of said annular clamping member 26, adjacent the faces of said V-shaped slot 31, provide two additional contact points or supports for the shaft, thereby preventing lateral shifting movement of the shaft, if the latter is of a diameter smaller than the diameter of opening 16. When said annular clamping member 26 is used, then ring 21 when shifted in a longitudinal relation with respect to sleeve 18, will contact with and press the rear end of said annular clamping member 26, driving the bevelled body surfaces adjacent said slot 31 in contact with and against the shaft reposing within said slot 31, thereby clamping the shaft to said cylinder 14 in the longitudinal adjusted relation of the shaft and in its angularly adjusted relation with shaft 12.

Said annular clamping member 26 is provided with a longitudinal bore 32 through which cylinder 14 extends, as is seen in Fig. 4.

Likewise, a shaft, corresponding to shaft 12, of a diameter smaller than the diameter of openings 11 may be employed. In that case sleeve 18 due to the action thereon by ring 21, shifts by its body portions adjacent recesses 19 toward and in contact with the shaft, as is indicated by dotted lines in Fig. 4, for bearing pressure against the shaft and for maintaining the same in an adjusted clamped relation.

When the two shafts have been clamped, with or without employment of said annular clamping member 26, on rotary turning of ring 21, a degree of frictional contactual pressure will have been engendered among the various parts of the clamping device. Notwithstanding this fact, it is still possible to shift the two shafts to bring them to a further angular adjusted relation, by exerting manual pressure upon the two shafts in a transverse direction. This manual pressure upon the shaft in a lateral direction will angularly shift the shafts only to a certain point beyond which the shafts will be incapable of angularly shifting with relation to each other no matter what degree of manual pressure is applied to the shaft. Therefore, a suitable adjustment mechanism in connection with one of said shafts has been provided, whereby the shaft may still be capable of angular shifting movement in either direction and past the point to which the shafts have been angularly shifted by application of manual force thereto.

The mechanism for finer angular mutual adjustment of the two shafts includes washer 33 having a bevelled rim 34 which is adapted to be seated upon the bevelled mouth of ring 21, it being understood that when said mechanism for finer adjustment of the shafts is employed said annular clamping member 26 is eliminated from the assembly.

Made upon the front face of said washer 33 in a radial relation therewith is a U-shaped recess 35, the inner end of which opens upon the inner rim of said washer 33, as is seen in Fig. 9.

Contacting with the front face of said washer 33 is an annular block 36. Both said washer 33 and said block 36 are each provided with a concentric alined bore through which cylinder 14 is extended. Said annular block 36 is further provided with a transverse bore 37 (Fig. 7), in register with opening 16 in said cylinder 14 for accommodating within said bore 37 and opening 16 said shaft 17.

Made in said annular block 36, in a spaced relation with the concentric bore therein and cylinder 14, is bore 38 (Fig. 8), for locating therewithin shaft 39. Integrally formed with the inner end of said shaft 39, in an eccentric relation therewith is a circular head 40, substantially corresponding in diameter to the diameter of said shaft 39. The crescent-shaped rim portion of said head 40, which extends beyond the periphery of said shaft 39, defines cam 40'. The peripheral portion of said head 40, which is diametrically removed from said cam 40', defines, in conjunction with the adjacent end rim portion of shaft 39, a recess 41', as is seen in Figs. 8 and 9. Said head 40, including its cam 40', is located within said recess 35, while the adjacent end of said shaft 39 remains flush with the inner end of said block 36, as seen in Fig. 8.

In the operative position of said head 40 within recess 35 the adjacent end of cam 40' remains in contact with the portion of the inner end of block 36 adjacent said bore 38, defining a bar which prevents removal of shaft 39 in the direction of the outer end of said block 36. In order to position said shaft 39 in an operative relation with said block 36, the former by its outer end is driven into bore 38 through the inner end thereof, prior to the mounting of said block 36 upon cylinder 14 and prior to the interconnecting of the two through shaft 17.

After said shaft 39 has been operatively positioned with relation to block 36, with cam 40' in a contactual relation with the inner end portion of said block 36, adjacent said bore 38, block 36 is thereupon mounted upon said cylinder 14, with the inner end of said block 36 in contact with the adjacent face of washer 33, locating said head 40 in a neutral position within recess 35. Thereupon shaft 17 is passed through opening 16 in said cylinder 14 and bores 37 in said block 36, which will interconnect said block 36 with cylinder 14. Thereupon handle 41 is passed through the outer free end of said shaft 39 and rigidly connected therewith, whereby said shaft 39 may be turned in either direction.

It is noted that the width of said recess 35, that is the distance between the lateral faces of said washer 33 adjacent said recess 35, substantially corresponds to the diameter of said shaft 39, as is clearly seen in Fig. 9.

While initially locating said head 40 within recess 35, it is preferable that cam 40' should be positioned either adjacent the closed end of said recess 35, as seen in Fig. 9, or adjacent the open opposed end thereof, either one of which positions is a neutral position for cam 40'. The position of said handle 41 is so related to head 40, cam 40', and recess 35 so as to constitute the outward indicating means as to whether or not said cam 40' remains in its neutral position. The position of said handle 41 with relation to head 40 and cam 40' for the purpose of indicating the neutral position of said cam 40' within recess 35, should be upon a plane extended through a chord of said head 40, of which chord the peripheral portion of cam 40' is a subtending arc. Expressed in other terms the neutral position aforesaid of cam 40' will be brought about when said handle 41 remains upon a plane transversely of recess 35. The juxtaposition of handle 41 with relation to the neutral position of cam 40', subject to the easiest visual indication that cam 40' remains in a neutral position, is the substantially parallel position of handle 41 with relation to shaft 17, as is seen in Fig. 8.

When said extensible member of the clamping device has been extended, with sleeve 18 bearing against shaft 12, and ring 21 brought in a frictional contact with said washer 33, the latter will exert pressure upon and bear against block 36 from the direction of the inner end thereof. This operation will cause block 36 to exert pressure upon shaft 17, against the action of cylinder 14 supporting said shaft 17 in a stationary relation, for firmly clamping said shaft 17 within cylinder 14 and block 36. Prior to the clamping action of block 36 upon shaft 17 just described, said shaft 17 may be manually brought to any desired angular relation with shaft 12 in order that the two shafts may be clamped in their angularly adjusted relation. Therefore, for the degree of angular adjustment of shafts 12 and 17 to the extent indicated, washer 33 and block 36 may be considered as one piece partaking of the action of clamping member 26.

It is only when finer mutual angular adjustment between shafts 12 and 17 is required or desired, that washer 33, block 36, shaft 39, cam 40' and handle 41 are brought into play. It is noted that due to the frictional contact between ring 21 and washer 33 and consequent drag therebetween, it is possible to rotatably turn block 36 and cylinder 14, independently of washer 33, in either direction, and thereby to bring about a finer angular adjustment of shaft 17 with relation to shaft 12, by the action of rotatably turning shaft 39 and cam 40' by actuating handle 41 in either direction. Assuming that cam 40' is in a neutral position aforesaid, with handle 41 in a parallel relation with shaft 17, manual shifting of said handle 41 to the extent of 90 degrees in either direction, will cause cam 40' to rotatably shift in either direction in order to bear against one or the other lateral wall of washer 33 adjacent said recess 35, depending upon the direction of the shifting movement of said handle 41. Said cam 40' bearing against one or the other of said lateral walls will cause the rotary shifting movement of said block 36 and cylinder 14 to one or the opposite direction, thereby bodily shifting shaft 17.

When said cam 40' has been brought to bear against the right hand lateral wall defining said recess 35, as viewed in Fig. 9, the rotary shifting movement of block 36 will be to the counter-clockwise direction as viewed in Fig. 9. When said cam 40' is caused to bear against the left hand side of the lateral wall in said washer 33, as viewed in Fig. 9, the rotary shifting movement of block 36 will be to the clockwise direction as viewed in Fig. 9. In either case the rotary movement imparted to block 36 to bring about the finer angular adjustment of shaft 17 with relation to shaft 12 is due to the inter-connection of said block 36 with cam 40' through the medium of shaft 39. During the rotary shifting movement of said block 36 through the action of cam 40' upon the lateral walls in washer 33 which define said recess 35, the inner end of block 36 simply rides upon the adjacent face of said washer 33, without in any manner causing the rotary shifting movement of said washer 33 due to the strong frictional engagement and consequent drag between said washer and the contacting end thereon by said ring 21.

It is further noted that the diameter of head 40 corresponds to the distance between the two lateral walls in said washer 33, defining said recess 35, thereby permitting free and unobstructed rotary movement of said head 40 within said recess 35.

When handle 41 remains in a longitudinal relation with said recess 35, and the consequent transverse relation with shaft 17, in either direction from its parallel relation with said shaft 17, this will visually indicate that the rise of cam 40' has been fully shifted to its operative contactual position with one or the opposite of said lateral walls in said washer 33 defining said recess 35, thereby indicating that the angular finer adjustment of shaft 17 with relation to shaft 12, to one or the opposite direction, has been accomplished.

Obviously, the finer angular adjustment between the two shafts will be only to the extent of the width of cam 40' at its widest point. It is also noted that when the rise of cam 40' is in contact with one of said lateral walls in said washer 33 defining said recess 35, the diametrically opposite point of said head 40, adjacent said recess 41', will be in contact with the opposite of said lateral walls defining said recess 35. This is due to the fact that the diameter of head 40 corresponds to the distance between the two lateral walls defining said recess 35.

It is also noted that cam 40' need not be brought under all conditions to the fullest extent in contact with one or the other of said lateral walls defining said recess 35, that is in position by its rise squarely in a transverse relation with recess 35. Shifting of cam 40' to a lesser extent will bring about angular adjustment of shaft 17 with relation to shaft 12 to a degree lesser than would be brought about were the rise of the cam squarely in a perpendicular transverse relation with one or the other of said lateral walls defining said recess 35.

Made at the end of said sleeve 18, opposite from that at which said recesses 19 are formed, is an inwardly directed flange 18' (shown in Fig. 3, but for the sake of clearness omitted from the remaining figures), which is of a diameter smaller than the diameter of sleeve 10. Said flange 18' is in the path of said sleeve 10, thereby preventing shifting of said sleeve 18 in the direction of the free end of said sleeve 10. The diameter of said flange 18' is larger than the diameter of cylinder 14 permitting free shifting movement of said cylinder 14 within said flange 18'. The outer end of cylinder 14 is provided with a circumferential groove 42 for disengageably accommodating therewithin snap ring 43. Flange 18', being in the path of sleeve 10 prevents disengagement of the extensible member and other appurtenances of the clamping device, past said sleeve 10, while said snap ring 43, being in the path of said clamping member 26, or of block 36, as the case may be, prevents shifting of said clamping member 26 or of said block 36, as the case may be, and said extensible member, past the free end of said cylinder 14.

Thus, said flange 18' and said snap ring 43 maintain the several parts of the clamping device in their loose assembled relative position after one or the other or both of said shafts 12 and 17 have been removed from the clamping device.

If desired, instead of employing flange 18' for the purpose hereinabove specified, a rigidly affixed or integrally formed lug directed inwardly in a radial relation with said sleeve 18 at the corresponding end of the latter may be employed.

It is further noted that in order to extend or to contract the said extensible member, including said sleeve 18 and said ring 21, said sleeve 18 may be manually held against rotation while a rotary movement to said ring 21 is imparted through manual operation. Therefore, recesses 19 in said sleeve 18 are not essential in order to bring about the extension or contraction of said extensible member. However, said recesses 19 in conjunction with shaft 12 and while accommodating the latter therewithin, as is seen in Figs. 4 and 7, define anchoring means for said sleeve 18 for preventing a rotary movement thereof when rotation is manually imparted to ring 21 in either direction for extending or contracting the said extensible member.

From a broader aspect of the invention either one of said shafts 12 or 17 may be considered as a stop upon the shaft retaining member 10—14, against which one end of the extensible member is adapted to bear, or with which the same is anchored, while exerting by its opposite end the clamping pressure upon the other of said shafts.

While there are described herein preferred embodiments of the present invention, it is nevertheless to be understood that minor changes may be made therein without departing from the spirit and scope of the invention as claimed.

What I claim as new is:

1. A clamping device for clamping a pair of shafts in a mutual longitudinal adjusted relation, comprising a shaft retaining member, said shaft retaining member being provided with transverse openings for insertion therewithin of the shafts, and a pair of telescopically arranged and threadedly interconnected annular members, said annular members being mounted upon said shaft retaining member in an encompassing relation therewith and interposed between the shafts, said annular members being capable of mutual extension or contraction when said annular members are mutually rotated to one or the opposite direction, in their extended mutual relation said annular members being capable of bearing against the shafts for interlocking the latter with said shaft retaining member, in their contracted mutual relation said annular members being capable of coming out of contact with the shafts for freeing the latter from their interlocked relation with said shaft retaining member.

2. A clamping device for clamping a pair of shafts in a mutually adjusted longitudinal and angular relation, comprising a shaft retaining member, said shaft retaining member including a pair of telescopically arranged elements, means for interconnecting said elements in a longitudinal relation, each of said elements being provided with a transverse opening for insertion therewithin of one of the shafts, the two shafts being capable of longitudinal shifting movement within said openings, said means permitting said elements to rotatably shift with respect of each other for adjusting the mutual angular relation of the shafts when in said openings, and a pair of annular members threadedly interconnected, said annular members being in an encompassing relation with said shaft retaining member and interposed between the two shafts, when said annular members are rotated to one or the opposite direction they are capable of selective mutual extension or contraction, when in an extended condition said annular members being capable of bearing against the shafts in opposed directions for maintaining the shafts locked with said shaft retaining member for maintaining the shafts in their mutual angular and longitudinal adjusted relations.

3. A shaft clamping device comprising a shaft retaining member, said shaft retaining member being provided with a transverse opening for reception therewithin of a shaft, a stop upon said shaft retaining member in a spaced relation with the shaft when the latter remains within said opening, and a pair of threadedly interconnected annular members, said annular members being in an encompassing relation with said shaft retaining member and interposed between said stop and the shaft, when said annular members are rotated to one or the opposite direction they are capable of selective extension and contraction, when in an extended mutual relation one of said annular members being capable of bearing against the shaft in a transverse direction for locking the same with said shaft retaining member.

4. A shaft clamping device comprising a shaft retaining member, said shaft retaining member being provided with a transverse opening for reception therewithin of a shaft, a clamping member mounted upon said shaft retaining member in an encompassing relation therewith, one end of said clamping member being provided with a diametrical, substantially V-shaped recess for accommodating therewithin the portions of the shaft at points past said opening, an extensible member, and stop means carried by said shaft retaining member against which one end of said extensible member is adapted to bear, said extensible member being capable of extension or contraction for selectively shifting the opposite end of said extensible member to or away from said clamping member, when said latter end of said extensible member is shifted in contact with said clamping member the former is capable of bearing against said clamping member for causing the latter to bear by its body portions adjacent said recess against the shaft for locking the latter with said shaft retaining member.

5. A shaft clamping device comprising an oblong shaft retaining member, said shaft retaining member being provided with a transverse opening for reception therewithin of a shaft, a clamping member mounted upon said shaft retaining member in an encompassing relation therewith, one end of said clamping member being provided with a diametrical recess for accommodating therewithin portions of the shaft in a transverse relation at points past said opening, an extensible member mounted upon said shaft retaining member in an encompassing relation therewith, and stop means carried by said shaft retaining member, one end of said extensible member being adapted to bear against said stop means, said extensible member being capable of extension or contraction for selectively shifting the opposite end thereof to or away from said clamping member, when said latter end of said extensible member is shifted in contact with said clamping member the same is capable of bearing against said clamping member for causing the latter to bear by its body portion adjacent said recess against the shaft for locking the latter with said shaft retaining member.

6. A clamping device for clamping a pair of shafts in a mutually adjusted angular relation, comprising a shaft retaining means, said shaft retaining means including a pair of telescopically arranged elements, means for interconnecting said elements in a longitudinal relation, each of said elements being provided with a transverse opening for insertion therewithin of one of the shafts, said second named means permitting said elements to rotatably shift one with respect to the other for adjusting the mutual angular relation of the shafts when in said openings, a block mounted upon one of said elements, said block being capable of engagement with one of the shafts, a washer mounted upon said last named element, said washer contacting with said block, an extensible member interposed between the other of said shafts and said washer, said extensible member being capable of selective extension and contraction for selectively bearing against said latter shaft and said washer or for disengagement therefrom, when said extensible member bears against said last mentioned shaft and said washer the same being capable of exerting pressure thereupon for locking both shafts with their respective elements for thereby locking both shafts in their mutually adjusted angular relation, and a cam mechanism coacting with said block and said washer for angularly shifting the shaft with which said block is in engagement for angularly shifting the latter shaft and thereby for bringing about a finer angular mutual adjustment between the two shafts.

7. A clamping device for clamping a pair of shafts in a mutually adjusted angular relation, comprising a shaft retaining means, said shaft retaining means including a pair of telescopically interconnected elements, each of said elements being provided with a transverse opening for insertion therewithin of one of the shafts, said elements being capable of rotary shifting movement one with respect to the other for adjusting the mutual angular relation of the shafts when in said openings, a block mounted upon one of said elements, said block being provided with a transverse bore in alinement with the opening in one of said elements, one of said shafts being accommodated within said latter opening and said bore, a washer mounted upon said last named element and in contact with said block, an extensible member interposed between the other of said shafts and washer, said extensible member being capable of selective expansion and contraction, when in an extended condition said extensible member being capable of exerting pressure upon said first mentioned shaft and said washer for locking both shafts with their respective elements for thereby maintaining the shafts in their mutually adjusted angular relation, and a cam mechanism supported by said block and acting upon said washer for imparting a rotary movement to said block and for thereby shifting the shaft with which said block is in engagement in a transverse relation with said elements for thereby bringing about a finer angular mutual adjustment between the two shafts.

8. A clamping device for clamping a pair of shafts in a mutually adjusted angular relation, comprising a shaft retaining means, said shaft retaining means including a pair of telescopically interconnected elements, each of said elements being provided with a transverse opening for insertion therewithin of one of the shafts, said elements being capable of rotary shifting movement one with respect to the other for adjusting the mutual angular relation of the shafts when in said openings, a block mounted upon one of said elements, said block being provided with a transverse bore in alinement with the opening in one of said elements, one of said shafts being accommodated within said latter opening and said bore, a washer mounted upon said last named element and in contact with said block, an extensible member interposed between the other of said shafts and said washer, said extensible member being capable of selective extension and contraction, when in an extended condition said extensible member being capable of exerting pressure upon said first mentioned shaft and said washer for locking both shafts with their respective elements for thereby maintaining the shafts in their mutually adjusted angular relation, said washer being provided with a recess, a shaft supported in said block for a rotary movement, a cam head integrally formed with one end of said last named shaft, said cam head being positioned within said recess, when a rotary movement is imparted to said last named shaft to one or the opposite direction said cam head being adapted to bear against the body portion of said washer adjacent said recess for imparting a rotary movement to said block with relation to said washer for angularly shifting the shaft with which said block is in engagement for thereby bringing about a finer angular mutual adjustment between the two shafts reposing within said openings.

9. A shaft clamping device comprising a shaft retaining means including a pair of telescopically arranged elements capable of rotary adjustment on a transverse plane one with respect to the other, a block mounted upon one of said elements, said block and said last named element being provided with registering openings for reception therewithin of a shaft, said block and said last named element being capable of rotary shifting movement with respect to the other of said elements for angularly adjusting said shaft with relation to said last named element, a washer mounted upon said first named element in a contactual relation with said block, an extensible member, stop means carried by said second named element, one end of said extensible member being adapted to bear against said stop means, means for extending or contracting said extensible member for selectively shifting the opposite end thereof to or away from said washer, when said latter end of said extensible member is shifted in contact with said washer the latter being capable of bearing against said block for locking the shaft with said first named element for maintaining the same in an angular adjusted relation with said second named element, and a cam mechanism associated with said block and coacting with said washer for imparting a rotary movement to said block with relation to said washer and said extensible member for bringing about a finer angular adjustment of the shaft with relation to said second named element.

10. A shaft clamping device comprising a shaft retaining means including a pair of telescopically arranged elements capable of rotary adjustment on a transverse plane one with respect to the other, a block mounted upon one of said elements, said block and said last named element being provided with registering openings for reception therewithin of a shaft, said block and said last named element being capable of rotary shifting movement with respect to the other of said elements for angularly adjusting said shaft with relation to said last named element, a washer mounted upon said first named element in a contactual relation with said block, an extensible member, stop means carried by said second named element, one end of said extensible member being adapted to bear against said stop means, means for extending or contracting said extensible member for selectively shifting the opposite end thereof to or away from said washer, when said latter end of said extensible member is shifted in contact with said washer the latter being capable of bearing against said block for locking the shaft with said first named element for maintaining the same in an angular adjusted relation with said second named element, said washer being provided with a recess, a shaft supported in said block for a rotary movement, and an eccentric cam head integrally formed with and dependent from one end of said last named shaft, said cam head being positioned within said recess, on impartation of a rotary movement to said last named shaft to one or the opposite direction said cam head being capable of bearing against one or the other of the body wall portions in said washer defining said recess for imparting a rotary shifting movement to said block to one or the opposite direction for bodily shifting the shaft reposing within said openings for thereby bringing about a finer angular adjustment of said first named shaft with relation to said second named element.

11. A shaft clamping device comprising a shaft retaining means including a pair of telescopically arranged elements capable of rotary adjustment on a transverse plane one with respect to the other, a block mounted upon one of said elements, said block and said last named element being provided with registering openings for reception therewithin of a shaft, said block and said last named element being capable of rotary shifting movement with respect to the other of said elements for angularly adjusting said shaft with relation to said last named element, a washer mounted upon said first named element in a contactual relation with said block, an extensible member, stop means carried by said second named element, one end of said extensible member being adapted to bear against said stop means, means for extending or contracting said extensible member for selectively shifting the opposite end thereof to or away from said washer, when said latter end of said extensible member is shifted in contact with said washer the latter being capable of bearing against said block for locking the shaft with said first named element for maintaining the same in an angular adjusted relation with said second named element, and means associated with said block and coacting with said washer for inducing a rotary shifting movement to said block with relation to said washer and said extensible member for bringing about a finer angular adjustment of the shaft with relation to said second named element, said last named means being capable of operation independently of the rotary shifting movement of one of said elements with respect to the other.

References Cited in the file of this patent
UNITED STATES PATENTS

| | | |
|---|---|---|
| 1,137,333 | Klorer | Apr. 27, 1915 |
| 1,511,677 | Page | Oct. 14, 1924 |
| 1,711,986 | Borough | May 7, 1929 |
| 2,287,890 | Legassy | June 30, 1942 |
| 2,456,505 | Hastings | Dec. 14, 1948 |
| 2,733,035 | Rocheleau | Jan. 31, 1956 |